Patented Apr. 25, 1950

2,505,533

UNITED STATES PATENT OFFICE 2,505,533

MONOAZO-DYESTUFFS

Friedrich Felix and Willy Mueller, Basel, Switzerland, assignors to Ciba Limited, Basel, Switzerland, a Swiss firm No Drawing. Application September 4, 1946, Serial No. 694,830. In Switzerland October 4, 1945

4 Claims. (Cl. 260—196)

According to this invention valuable new monoazo-dyestuffs are made by coupling a sulfonic acid of 2-aminonaphthalene or a nuclear substitution product thereof in an acid medium with a diazo-compound of an amine of the general formula:

R—O—R—NH₂ in which one R represents phenyl and the other R represents phenyl or benzyl, the phenyl nuclei of which radicals may contain further substituents, for example, an alkyl, alkoxy or carboxyl group, or a halogen atom, but not nitro groups or sulfonic acid ester or sulfon-amido groups.

As alkyl or alkoxy groups there can be used especially the methyl and the ethyl groups or the methoxy and the ethoxy groups. Among the halogen substituents mention is to be made of bromine, for example, especially of chlorine. Furthermore, several similar or different substituents may be present in the molecule.

As starting materials for making the new dyestuffs there may be mentioned the following amines: 4-amino-1:1'-diphenyl ether, 2:4'-dichloro-4-amino-1:1'-diphenylether, 3- or 4-amino-1:1'-phenyl benzyl ether, 5-amino-2-methyl-1:1'-phenyl benzyl ether, 5-bromo-3-amino-2-methyl-1:1'-phenyl benzyl ether, 4-chloro-2'-amino-1:1'-phenyl benzyl ether and the like.

Especially valuable are the dyestuffs derived from diazo compounds of the amines of the aforesaid kind of which the amino group occupies a 2-position relatively to the ether bridge. Among these dyestuffs special mention is to be made of those which are derived from 2-amino-1:1'-diphenylethers substituted by halogen atoms, for example chlorine atoms. In these ethers one or several halogen atoms may be present in the molecule, for example, in 4-, 2'- and/or 4'-position. Examples of such compounds are:

4-chloro-2-amino-1:1'-diphenyl ether,
4-chloro-2-amino - 3' - methyl - 1:1' - diphenyl ether,
4:4'-dichloro-2-amino-1:1'-diphenyl ether,
4:2'-dichloro-2-amino-1:1'-diphenyl ether and the like.

The aminodiphenyl ethers can be made for example by the reaction of a halogen-nitrobenzene which contains a reactive halogen atom with an alkali salt of a phenol followed by reduction of the nitro group to an amino group; and the amino phenyl benzyl ethers, for example, by the reaction of a benzyl halide with an alkali salt of a phenol, the components being so chosen that the reaction product contains a nitro group, the latter group being reduced after the reaction to an amino group.

As coupling components for making the new dyestuffs there are especially suitable 2-aminonaphthalene sulfonic acids which contain a hydroxyl group as a nuclear substituent, for example, 2 - amino - 8-hydroxynaphthalene-6-sulfonic acid, 2-amino-5-hydroxynaphthalene-7-sulfonic acid, 2-amino-3-hydroxynaphthalene-7-sulfonic acid, 2-amino-7-hydroxynaphthalene-4-sulfonic acid, and the like; but also, for example, 2-aminonaphthalene-6-sulfonic acid, 2-aminonaphthalene-7-sulfonic acid, 2-aminonapthalene-3:6-disulfonic acid, 2-aminonaphthalene-5:7-disulfonic acid and the like.

The new dyestuffs correspond to the general formula

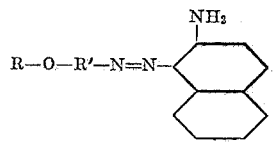

in which one of the radicals R and R' represents phenyl and the other represents phenyl or benzyl, and in which the aminonaphthalene residue contains as substituents at least one sulfo group and if desired further substituents, for example, hydroxyl groups.

The following examples illustrate the invention, the parts being by weight:

Example 1

25.4 parts of 2':4-dichloro-2-amino-1:1-diphenyl ether are diazotized in the usual manner with 25 parts of hydrochloric acid of 30 per cent. strength and 6.9 parts of sodium nitrite in 200 parts of water at 0–5° C. 23.9 parts of 2-amino - 8 - hydroxynaphthalene - 6 - sulfonic acid are dissolved in 300 parts of water with 5.5 parts of sodium carbonate, and the clear diazonium solution is run in at 0–5° C. The whole is stirred for one hour at 5–8° C., and then a solution of 30 parts of crystalline sodium acetate in 75 parts of water is introduced dropwise in the course of one hour. After stirring for 6 hours at 10–12° C. the diazonium compound disappears. The whole is then slowly warmed to 40–50 C., and the dyestuff so formed is separated by filtration after the addition of 20 parts of sodium chloride. When dry the dyestuff which corresponds in the free acid state to the formula

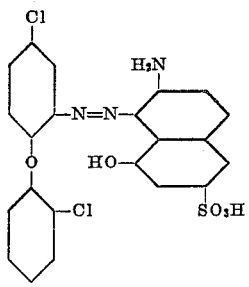

is a dark red powder which dissolves in water with a red coloration and dyes wool from an acid bath clear bluish red tints having good properties of wet fastness and an excellent fastness to light.

A dyestuff having similar properties is obtained by using in this example, instead of 2':4-dichloro-2-amino-1:1 -diphenyl ether, 4:4'-dichloro-2-amino-1:1'-diphenyl ether.

*Example 2*

25.4 parts of 2':4-dichloro-2-amino-1:1'-diphenyl ether are diazotized with 25 parts of hydrochloric acid of 30 per cent. strength and 6.9 parts of sodium nitrite in 200 parts of water at 0–5° C. The clear diazonium solution is run at 0–5° C. into a neutral solution of 22.3 parts of 2-aminonaphthalene-6-sulfonic acid in 300 parts of water. The coupling mixture is maintained at a weakly mineral acid reaction by introducing a 10 per cent. solution of sodium carbonate dropwise. After 12 hours the temperature is allowed to rise of 10–15° C., and the whole is stirred for a further 12 hours at the same temperature. By the end of this period the diazonium compound disappears. The whole is then warmed to 40–50° C., a sufficient quantity of sodium carbonate is added to render the solution distinctly alkaline, and the dyestuff so formed which corresponds in the free acid state to the formula

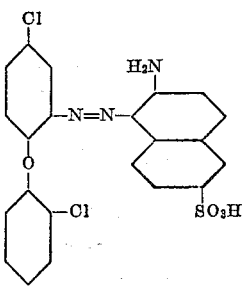

is separated by filtration after the addition of 30 parts of sodium chloride.

When dry the dyestuff is a red powder which dyes wool from an acid bath clear orange-red tints having good properties of wet fastness and fastness to light.

Dyestuffs having similar properties are obtained by using in this example, instead of 2':4-dichloro-2-amino-1:1' - diphenyl ether, 4:4' - dichloro-2-amino-1:1'-diphenyl ether, 2'-chloro-2-amino-1:1'-diphenyl ether or 4-chloro-2-amino-1:1'-diphenyl ether.

*Example 3*

0.2 part of the dyestuff obtained as described in the first paragraph of Example 1 is dissolved in 400 parts of water, 1 part of crystalline sodium sulfate is added to the dyebath, and 10 parts of wool are entered at 40–50° C. 0.3 part of acetic acid is then added, the bath is slowly brought to a gentle boil in the course of ½ hour, and dyeing is carried on for ¾ hour at that temperature. After rinsing and drying a bluish-red dyeing is obtained, which has good properties of fastness, more especially a very good fastness to light.

*Example 4*

10 parts of wool are dyed by the procedure described in Example 3 with 0.2 part of the dyestuff obtained as described in the first paragraph of Example 2. A clear orange red dyeing having good properties of fastness is obtained.

What we claim is:

1. A monoazo dyestuff which in the free state corresponds to the formula

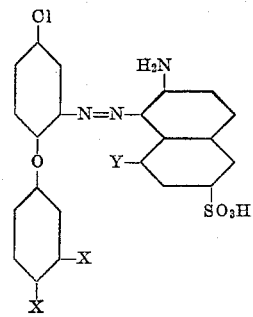

wherein one X stands for hydrogen and the other X for chlorine, and Y stands for a member of the group consisting of H and OH.

2. The dyestuff which in the free acid state corresponds to the formula

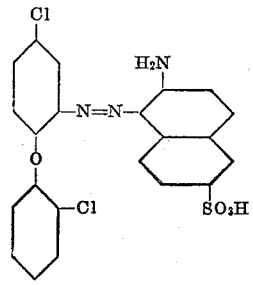

3. The dyestuff which in the free acid state corresponds to the formula

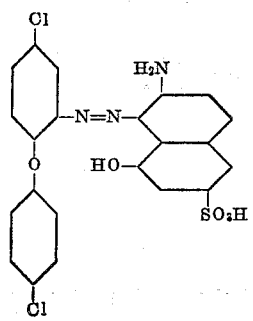

4. The dyestuff which in the free acid state corresponds to the formula

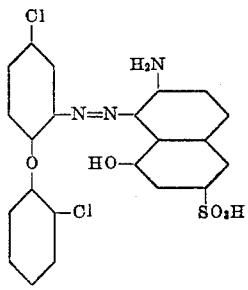

FRIEDRICH FELIX.
WILLY MUELLER.

REFERENCES CITED

The following references are of record in the file of this patent:

UNITED STATES PATENTS

| Number | Name | Date |
|---|---|---|
| 2,156,593 | Krebser | May 2, 1939 |
| 2,205,848 | Fischer | June 25, 1940 |

FOREIGN PATENTS

| Number | Country | Date |
|---|---|---|
| 221,491 | Germany | Apr. 27, 1910 |
| 23,204 | Great Britain | of 1909 |
| 14,820 | Great Britain | of 1909 |
| 369 | Great Britain | of 1910 |
| 424,355 | Great Britain | Feb. 20, 1935 |
| 502,309 | Great Britain | Mar. 15, 1939 |

Disclaimer 2,505,533.—*Friedrich Felix* and *Willy Mueller*, Basel, Switzerland, MONOAZO-DYESTUFFS. Patent dated Apr. 25, 1950. Disclaimer filed July 31, 1950, by the assignee, *Ciba Limited*.

Hereby enters this disclaimer to claim 1 of said patent.

[*Official Gazette, Sept. 5, 1950.*]